W. H. WAGGONER.
FILTER.
APPLICATION FILED FEB. 29, 1916.

1,218,915.

Patented Mar. 13, 1917.

Witnesses

W. H. Waggoner, Inventor by C. A. Snow & Co.

Attorneys

UNITED STATES PATENT OFFICE.

WILLIAM H. WAGGONER, OF JEANERETTE, LOUISIANA.

FILTER.

1,218,915.  Specification of Letters Patent.  Patented Mar. 13, 1917.

Application filed February 29, 1916. Serial No. 81,285.

*To all whom it may concern:*

Be it known that I, WILLIAM H. WAGGONER, a citizen of the United States, residing at Jeanerette, in the parish of Iberia and State of Louisiana, have invented a new and useful Filter, of which the following is a specification.

The device forming the subject matter of this application is a filter, adapted to handle liquor of all kinds, but of peculiar utility in connection with cane juice.

The invention aims to provide novel means for separating the juice from the solid matter, and to provide novel means for disposing of the juice and the solid matter.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1:
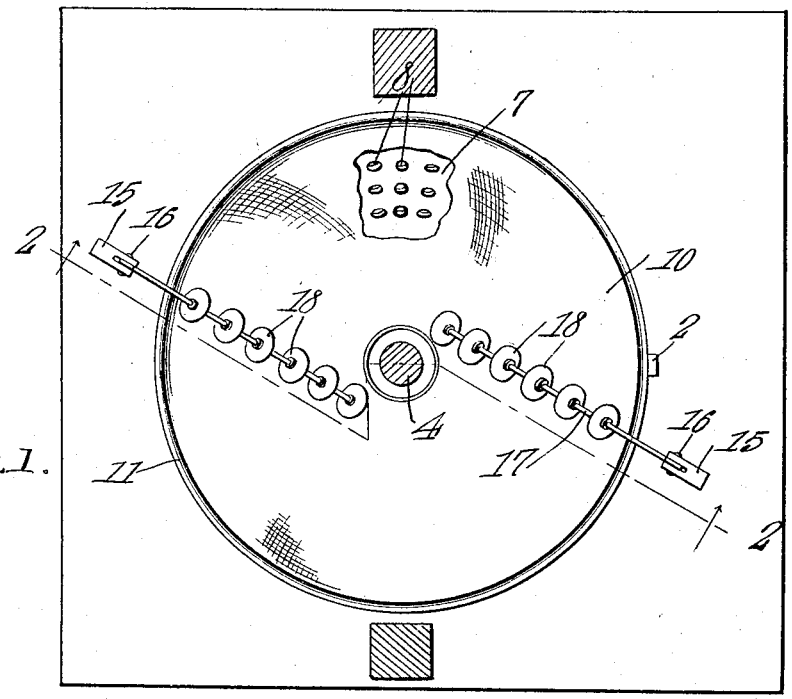
Figure 2:
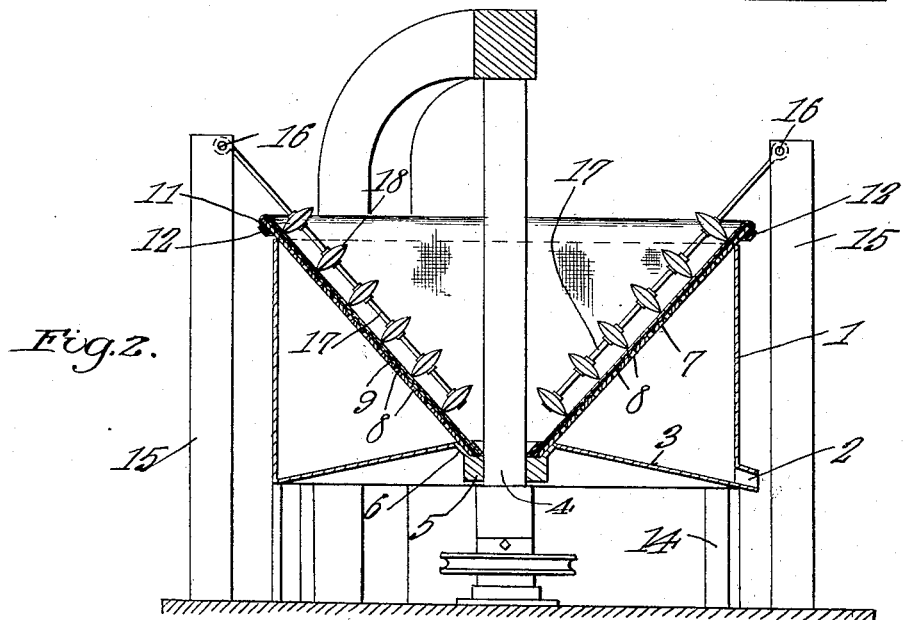

Figure 1 shows the invention in top plan; Fig. 2 is a section on the line 2—2 of Fig. 1.

In carrying out the present invention there is provided a tank 1 supported in any suitable manner as by a frame 14. The tank 1 is provided with an inclined bottom 3 which slants downwardly and outwardly toward the periphery of the tank, the tank being provided near its bottom with an outlet 2. The numeral 4 designates an upright shaft passing through the bottom 3 of the tank 1 and journaled for rotation therein, the shaft 4 carrying a support 5 having a flange 6. Supported on the flange 6 and located within the tank 1 is a cone 7 which overhangs the upper edge of the tank 1, the cone 7 being equipped with perforations 8. Supported on the cone 7 is a screen 9 which may be made of wire netting. Superposed on the screen 9 is a covering 10 which may be made of cloth. The upper edges of the covering 10 and the screen 9 overhang the upper edge of the cone 11 and are secured thereto in any suitable way, as by a retaining ring 12 which, for convenience in application, may be made in a plurality of parts. The lower ends of the covering 10 and the screen 9 are bound against the flange 6 by a retaining ring 12.

The numeral 15 indicates supports of any desired sort, located adjacent the tank 1. Pivoted to the supports 15 as shown at 16 are shafts 17 which lie within the cone 7. The shafts 17 may move vertically, so as to lie parallel to the wall of the cone 7, but are so connected with the supports 15 that they cannot swing sidewise. The shafts 17 are disposed in angular relation to the elements of the cone, as clearly indicated in Fig. 1. Journaled for rotation on the shafts 17 and held in spaced relation longitudinally of the shafts, are scraper wheels 18 each of which is disposed at an angle to the orbit of a point on the cone.

In practical operation, the cane juice or liquid which is to be filtered is placed within the cone 7. The cone then is rotated rapidly by means of the shaft 4. The cane juice moves outwardly through the covering 10 and through the screen 9, the juice passing through the perforations 8 of the cone. The juice is thrown against the side wall of the tank 1, or if the juice drops on the bottom 3 of the tank, the juice flows outwardly, because the bottom is inclined. Ultimately, the filtered juice flows away through the outlet 2.

Any solid matter carried in the juice will be held on the cloth covering 10. When the cone 7 is rotated, the wheels 18 will be rotated also, due to their frictional contact with the covering 10. Owing to the specific disposition of the shafts 17 with respect to the cone as shown in Fig. 1, and owing to the relations existing between the wheels 18 and the cone, the solid material on the cloth covering 10 will be loosened and will be advanced toward the periphery of the cone, the solid matter ultimately being thrown upwardly over the upper edge of the cone by centrifugal force, so called, when the cone is rotated.

The device forming the subject matter of this application is adapted to filter cane juice as the same is discharged from the heater. No settling tanks, filter presses, pumps and mud tanks are required. The structure forming the subject matter of this application may be tended and operated by one person and it requires but little floor space. The structure is simple and not likely to get out of order, and may be so constructed as to handle any amount of juice delivered from the heater. The device herein disclosed will decrease about one-half the amount of water necessary for the washing and filtering operations.

Having thus described the invention, what is claimed is:—

1. In a device of the class described, a tank; an upright shaft journaled in the tank; a perforated cone carried by the shaft and extended within the tank, the cone having its smaller end disposed downwardly; an arm extended within the cone; a scraper carried by the arm; and means for pivotally mounting the arm at its outer end for vertical swinging movement whereby the scraper will coöperate with the cone, the arm being disposed at an angle to a radius of the shaft passing through the pivotal mounting of the outer end of the arm.

2. In a device of the class described, a tank; an upright shaft journaled in the tank; a perforated cone carried by the shaft and extended within the tank, the cone having its smaller end disposed downwardly; an arm extended within the cone; a scraper carried by the arm and disposed substantially at right angles to the axis of the arm; and means for mounting the arm at its outer end for vertical swinging movement whereby the scraper will coöperate with the cone, the arm being disposed at an angle to a radius of the shaft passing through the pivotal mounting of the outer end of the arm.

3. In a device of the class described, a tank; an upright shaft journaled in the tank; a perforated cone carried by the shaft and extended within the tank, the cone having its smaller end disposed downwardly; an arm extended within the cone; a plurality of scrapers rotatably mounted on the arm and located one above another, the scrapers being disposed substantially at right angles to the axis of the arm; and means for pivotally mounting the arm at its outer end for vertical swinging movement whereby the scrapers will coöperate with the cone, the arm being disposed at an angle to a radius of the shaft passing through the pivotal mounting of the outer end of the arm.

4. In a device of the class described, a tank having a bottom which slants downwardly and outwardly toward the periphery of the tank, the tank being provided with an outlet; a shaft journaled for rotation in the tank; a perforated cone carried by the shaft and located within the tank; a support; a shaft pivoted to the support for swinging movement in a plane parallel to the axis of the shaft; and a wheel journaled on the shaft and in contact with the cone, whereby the wheel will be rotated when the cone is rotated.

In testimony that I claim the foregoing as my own, I have hereto affixed my signature in the presence of two witnesses.

WILLIAM H. WAGGONER.

Witnesses:
CAMILLE PROVOST,
EUGENE MUTRUX.

Copies of this patent may be obtained for five cents each, by addressing the "Commissioner of Patents, Washington, D. C."